United States Patent
Werdecker et al.

(10) Patent No.: US 11,680,644 B2
(45) Date of Patent: Jun. 20, 2023

(54) ZERO-EMISSION MECHANICAL SEAL ARRANGEMENT

(71) Applicant: EagleBurgmann Germany GmbH & Co. KG, Wolfratshausen (DE)

(72) Inventors: Ferdinand Werdecker, Walchensee (DE); Andreas Fesl, Otterfing (DE); Michael Müller, Bichl (DE); Josef Strobl, Rottach-Egern (DE); Johannes Strohmeier, Gmund (DE); Benjamin Hellmig, Munich (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 213 days.

(21) Appl. No.: 17/057,780

(22) PCT Filed: Apr. 25, 2019

(86) PCT No.: PCT/EP2019/060552
§ 371 (c)(1),
(2) Date: Nov. 23, 2020

(87) PCT Pub. No.: WO2019/228714
PCT Pub. Date: Dec. 5, 2019

(65) Prior Publication Data
US 2021/0207715 A1 Jul. 8, 2021

(30) Foreign Application Priority Data
May 29, 2018 (DE) ...................... 10 2018 208 519.6

(51) Int. Cl.
*F16J 15/32* (2016.01)
*F16J 15/34* (2006.01)

(52) U.S. Cl.
CPC ......... *F16J 15/3404* (2013.01); *F16J 15/342* (2013.01)

(58) Field of Classification Search
CPC ............................ F16J 15/3404; F16J 15/342
See application file for complete search history.

(56) References Cited

U.S. PATENT DOCUMENTS 2,036,308 A * 4/1936 Vroom ................... F16J 15/342
277/389
5,533,739 A 7/1996 Sedy
(Continued)

FOREIGN PATENT DOCUMENTS

CN          101776152 A    7/2010
CN          201992064 U    9/2011
(Continued)

OTHER PUBLICATIONS

International Search Report issued in PCT/EP2019/060552, dated Jun. 25, 2019.
Chinese Office Action dated Apr. 2, 2022, issued during the prosecution of Chinese Patent Application No. CN 201980035299.5.

*Primary Examiner* — Vishal A Patel
(74) *Attorney, Agent, or Firm* — Locke Lord LLP; Scott D. Wofsy; Michael J. Pollack

(57) ABSTRACT

The invention relates to a gas-lubricated mechanical seal arrangement (1) comprising a first mechanical seal (2) having a first rotating slide ring (21) and a first slide ring (22) defining a first sealing gap (23) between sealing surfaces (21a, 22a), the first slide ring (22) having a passageway (25) for supplying a barrier fluid to the first sealing gap (23), wherein the passageway (25) extends from a rear surface (22b) to the sliding surface (22a) of the first stationary slide ring (22), and wherein on the first rotating slide ring (21) a first secondary seal (4) for sealing and a centering device (5) for centering of the first rotating slide ring (21) are arranged.

9 Claims, 2 Drawing Sheets

(56) References Cited

U.S. PATENT DOCUMENTS

| | | | | |
|---|---|---|---|---|
| 6,135,458 A | * | 10/2000 | Fuse | F16J 15/342 277/400 |
| 6,213,473 B1 | * | 4/2001 | Lebeck | F16J 15/342 277/408 |
| 6,325,382 B1 | * | 12/2001 | Iwamoto | F16J 15/342 277/412 |
| 7,744,094 B2 | * | 6/2010 | Yanagisawa | F16J 15/342 277/408 |
| 8,800,995 B2 | * | 8/2014 | Suefuji | F16J 15/342 277/401 |
| 9,175,576 B2 | * | 11/2015 | Grieshaber | F02C 7/28 |
| 9,341,077 B2 | * | 5/2016 | Grieshaber | F01D 11/02 |
| 2002/0079648 A1 | * | 6/2002 | Uth | F16J 15/342 277/401 |
| 2011/0189013 A1 | * | 8/2011 | Alfes | F16J 15/002 277/411 |
| 2017/0335966 A1 | * | 11/2017 | Werdecker | F04D 29/124 |
| 2017/0356453 A1 | * | 12/2017 | Goldswain | F16J 15/342 |

FOREIGN PATENT DOCUMENTS

| | | | | |
|---|---|---|---|---|
| CN | 102853085 A | | 1/2013 | |
| DE | 102014226429 A1 | * | 6/2016 | F01D 11/003 |
| DE | 102015226444 A1 | | 6/2017 | |
| EP | 2735777 A1 | * | 5/2014 | F16J 15/342 |
| EP | 2735777 A1 | | 5/2014 | |
| JP | H0599345 A | | 4/1993 | |
| JP | H0571647 B2 | | 10/1993 | |
| JP | 2015224650 A | | 12/2015 | |
| WO | 9604497 A1 | | 2/1996 | |

* cited by examiner

ZERO-EMISSION MECHANICAL SEAL ARRANGEMENT

CROSS-REFERENCE TO RELATED APPLICATIONS

This application is a U.S. National Phase Application filed under 35 U.S.C. § 371, based on International Patent Application No. PCT/EP2019/060552, filed Apr. 25, 2019, which claims priority to German Patent Application No. 10 2018 208 519.6, filed May 29, 2018. The entire contents of these applications is incorporated herein by reference.

The present invention relates to a gas-lubricated mechanical seal arrangement and a zero emission compressor, which mechanical seal arrangement is able to completely prevent escape of a medium to be sealed.

Mechanical seal arrangements are known from state of the art in various configurations. For example, DE 10 2015 226 444 A1 reveals a mechanical seal arrangement for toxic media, able to significantly reduce leakage of a barrier fluid towards the product side. In a slide surface, a circumferential groove having feeding recesses is provided, which is very complex in manufacture. Furthermore, mechanical seal arrangements are used, for example, for sealing on shafts of compressors or superchargers conveying gaseous methane or natural gas or another gas containing methane. Methane is not a toxic medium, but methane is a gas that exponentially increases the greenhouse effect compared to carbon dioxide. Therefore, leakage of methane through the mechanical seal arrangement should be prevented if possible. Furthermore, gases containing methane are conveyed from remote areas, especially via very long pipelines. A large number of so-called compressor stations are arranged along the pipelines, each of which has a compressor or supercharger or the like the drive shaft of which is required to be sealed using a mechanical seal arrangement. As such compressor stations are poorly accessible, it must be ensured that the mechanical seal arrangement is substantially maintenance-free and no methane will escape into the atmosphere via the mechanical seal arrangement.

Therefore, the object of the present invention is to provide a mechanical seal arrangement and a compressor with a simple design, which are easy and inexpensive to manufacture, thus preventing a medium which is to be sealed to escape into the atmosphere with maximum safety.

This object will be solved by a mechanical seal arrangement having the characteristics of claim 1 and a compressor having the characteristics of claim 12. Preferred embodiments of the invention will be shown in the subclaims.

The gas-lubricated mechanical seal arrangement according to the invention having the characteristics of claim 1 is able to prevent a product to be sealed, in particular a methane-containing gas, from reach the atmosphere, with maximum security. Nevertheless, the mechanical seal arrangement has a relatively simple and low-cost design. According to the invention, this will be achieved in that the mechanical seal arrangement comprises a first mechanical seal having a first rotating and a first stationary slide ring, defining a first sealing gap therebetween The first stationary slide ring comprises a passageway, preferably in the form of a bore-hole, for supplying a barrier fluid. The passageway extends from a rear surface of the first stationary slide ring to a sliding surface of the first stationary slide ring. Furthermore, a first secondary seal and a centering device are arranged on the first rotating slide ring for sealing and centering the first rotating slide ring, respectively. Thus, separation of a sealing function and a centering function of the first rotating slide ring is achieved on the rotating slide ring by using two separate components. The first rotating slide ring can be free of recesses or the like.

Preferably, the mechanical seal arrangement comprises a second mechanical seal having a second rotating slide ring and a second stationary slide ring, defining a second sealing gap therebetween. Thus, the second mechanical seal is a safety seal preventing the product from escaping to the atmosphere in case of failure of the first mechanical seal. Thus, the mechanical seal arrangement is a so-called tandem arrangement comprising two mechanical seals arranged in series.

Preferably, the second centering device for centering the first rotating slide ring is arranged on a radially inner surface and/or a radially outer surface of the first rotating slide ring.

Preferably, the first secondary seal is arranged on a rear surface of the first rotating slide ring for sealing. Preferably, the first secondary seal is arranged in a groove in a slide ring carrier for the rotating slide ring.

Further preferably, a second and a third secondary seal are arranged on a rear surface of the first stationary slide ring. A fluid path extending towards the passageway in the first stationary slide ring is located between the second and third secondary seals. This means that the barrier fluid flows from the rear surface of the first stationary slide ring in a region between the second and third secondary seal into the passageway and from there towards the sealing gap.

Especially preferred, the arrangement is configured such that a first radius $R1$ of the first secondary seal is between a second radius $R2$ of the third secondary seal and a third radius $R3$ of the fourth secondary seal. The radii are determined starting from a central axis of the mechanical seal arrangement. In other words, the inequation $R2<R1<R3$ will be satisfied. This ensures tilting of the first stationary mechanical slide ring relative to the second stationary mechanical slide ring to be avoided.

Especially preferably, the first radius $R1$ is in the middle between the second radius $R2$ and the third radius $R3$, i.e. $R1=(R2+R3)/2$.

Further preferably, the mechanical seal arrangement also includes a nitrogen source ($N2$ source). Preferably, the nitrogen source is a nitrogen tank. Preferably, the mechanical seal arrangement also includes a nitrogen generator. This allows nitrogen to be generated from the ambient air and to be temporarily stored in the nitrogen tank. Then, the nitrogen can be fed from the nitrogen tank to the passageway on the first stationary mechanical seal as a gaseous barrier fluid for the mechanical seal arrangement.

Preferably, the mechanical seal arrangement also includes a flow meter, which is arranged in a feed line to feed the barrier fluid to the passageway, as well as a control unit and a differential pressure control valve, which is arranged in a feed line. Furthermore, a pressure sensor is arranged at the product chamber to communicate an actual product pressure to the control unit. The control unit is installed to control the differential pressure control valve, especially based on the product pressure.

Further preferably, the mechanical seal arrangement furthermore comprises a monitoring device, which is arranged in a return line extending from a region between the first and second mechanical seal and communicating a failure signal, e.g. to a control station or the like, in case of failure of the mechanical seal.

A preferred example embodiment of the invention is described in detail below while reference will be made to the accompanying drawing, wherein:

FIG. 1 shows a schematic section view of a gas-lubricated mechanical seal arrangement 1 according to a first example embodiment of the invention.

Figure 1:
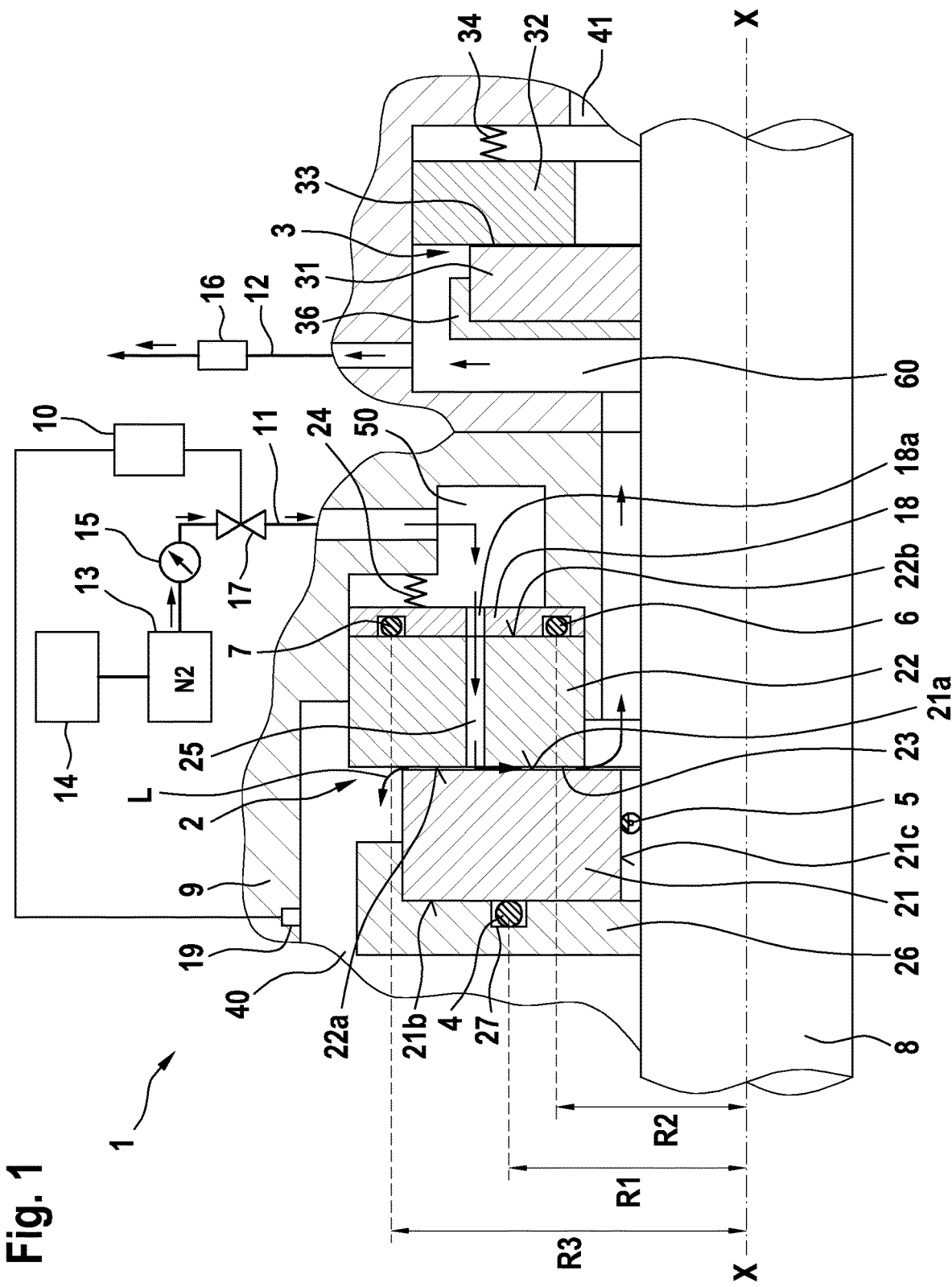
FIG. 1 is a schematic section view of a mechanical seal arrangement according to a first preferred example embodiment of the invention.

The mechanical seal arrangement 1 comprises a first mechanical seal 2 and a second mechanical seal 3, the two mechanical seals being arranged in series on a shaft 8 and sealing a product chamber 40 from an atmosphere region 41. This is a so-called tandem arrangement in which the first and second mechanical seals 2, 3 are arranged in series.

The first mechanical seal 2 comprises a first rotating slide ring 21 and a first stationary slide ring 22, defining a first sealing gap 23 between their sliding surfaces. The first rotating slide ring 21 comprises a sliding surface 21a and the first stationary slide ring 22 comprises a sliding surface 22a. Furthermore, the first mechanical seal 2 comprises a first biasing member 24, which biases the first stationary slide ring 22 in the direction of a central axis X-X of the mechanical seal arrangement. The first stationary slide ring 22 is fixed to a housing 9.

The second mechanical seal 3 comprises a second rotating slide ring 31 and a second stationary slide ring 32, defining a second sealing gap 33 between their sliding surfaces. The second rotating slide ring 31 is fixed to the shaft 8 by means of a second slide ring carrier 36. A second biasing member 34 biases the second stationary slide ring 32 in the direction of the second rotating slide ring 31.

The mechanical seal arrangement 1 is a gas-lubricated mechanical seal arrangement comprising a barrier fluid in the form of nitrogen. For this purpose, the mechanical seal arrangement 1 comprises a nitrogen source 13 feeding nitrogen to the first mechanical seal 2 via a feed line 11.

As shown in FIG. 1, the first stationary slide ring 22 is provided with a passageway 25 extending from a rear surface 22b to the sliding surface 22a of the first stationary slide ring 22. The passageway 25 is straight and parallel to the central axis X-X.

The reference number 14 designates a nitrogen generator which utilizes nitrogen from the air to feed it to the nitrogen source 13, which is a nitrogen tank, for example.

In FIG. 1, the flow path of the barrier fluid is shown by the arrows, starting from the nitrogen source 13 via the feed line 11 to the passageway 25. A pressure of the barrier fluid is slightly higher than a pressure of the medium to be sealed in the product chamber 40, so that even a small amount of nitrogen flows to the product chamber 40 as a leakage L. As herein the product is a methane-containing gas, contamination of this product to be sealed by nitrogen is negligible, especially as the quantities involved are very small.

The major portion of the barrier fluid exits at the radial inside of the first mechanical seal 2 at the first sealing gap 23, then flowing towards the second mechanical seal 3 and from there into a return line 12. The barrier fluid can then be discharged from the return line 12 to the atmosphere.

As can be seen from FIG. 1, a first secondary seal 4 and a centering device 5 are arranged on the first rotating slide ring 21. The first secondary seal 4 is located at a rear surface 21b of the first rotating slide ring 21. Herein, the first rotating slide ring 21 is attached to the shaft 8 by means of a first slide ring carrier 26. A groove 27 is provided in the first slide ring carrier 26, in which the first secondary seal 4 is arranged. In this example embodiment, the first secondary seal 4 is an O-ring having circular cross-section, which is exclusively for sealing on the rear surface 21b of the first rotating slide ring 21.

The centering device 5 is a ring-shaped biasing spring. The centering device 5 is arranged on a radially inner surface 21c of the first rotating slide ring 21. The centering device 5 is used to center the first rotating slide ring 21. Thus, the centering device 5 has no sealing function but only a centering function. As centering of the first rotating slide ring is performed by the centering device 5, the first secondary seal 4 may optimally be designed with regard to the sealing function thereof on the rear surface 21b.

A second secondary seal 6 and a third secondary seal 7 are arranged on a rear surface 22b of the first stationary slide ring 22. As can be seen from FIG. 1, a retaining ring 18 is provided on the rear surface 22b, which comprises a groove to accommodate the second and third secondary seals 6, 7. The second and third secondary seals are arranged such that a fluid path of the barrier fluid extends between the second secondary seal 6 and the third secondary seal 7. A through-hole 18a is also provided in the retaining ring.

As shown in FIG. 1, the first secondary seal 4 has a first radius R1, measured from the central axis X-X of the mechanical seal arrangement. The second secondary seal 6 has a second radius R2 and the third secondary seal 7 has a third radius R3. As can be seen in FIG. 1, the first radius R1 is between the second radius R2 and the third radius R3. Thus, the inequality R2<R1<R3 is satisfied. This especially can prevent the slide rings of the first mechanical seal 2 from tilting against each other. Thus, the first sealing gap 23 can be maintained constantly and with small dimensions during operation, so that leakage L of the barrier fluid into the product can be minimized.

The mechanical seal arrangement 1 further comprises a control unit 10 and a differential pressure control valve 17 in the feed line 11, and a flow sensor 15 in the feed line 11, which measures a flow rate passing through the feed line 11. A pressure sensor 19 is located at the product chamber 40 communicating a product pressure to the control unit 10, which is arranged to set a pressure level in a first chamber 50 in front of the first mechanical seal 2 based on the pressure in the product chamber 40. This automatically results in a pressure in a second chamber 60 between the first mechanical seal 2 and the second mechanical seal 3 which is lower than a pressure in the first chamber 50. The control unit 10 can control a degree of opening or closing of the differential pressure control valve 17. The degree of opening and closing of the differential pressure control valve 17 is determined based on the product pressure. A pressure in the first chamber 50 is set by the adjustable differential pressure control valve 17 such that the pressure in the first chamber 50 is always higher than a product pressure in the product chamber 40. Due to restricting the path of the barrier fluid, the pressure in the first chamber 50 is also always higher than in the second chamber 60.

Thus, zero emission of the product from the product chamber 40 into the atmosphere 41 is ensured. Thus the gas-lubricated tandem mechanical seal arrangement allows to seal especially natural gas or methane-containing gas. Due to the simple and robust design of the mechanical seal arrangement 1, maintenance-free operation is achieved. The second mechanical seal 3 serves as a safety seal in case of damage of the first mechanical seal 2 is damaged or fails for other reasons. Thus, the second mechanical seal 3 can ensure sealing against atmosphere 41 despite of the shaft 8 is still being rotated.

In addition, a monitoring device 16 is arranged in the return line 12, which monitors the function of the mechanical seal arrangement, communicating a corresponding interference signal, for example to a control station, in the event of failure or damage to the mechanical seal arrangement. This ensures maximally fast repair of the first mechanical seal 2 in case of failure of the first mechanical seal 2. For example, the monitoring device 16 can determine damage to the first mechanical seal 2 on the basis of a pressure level in the return line 12 and/or a flow rate of the barrier fluid. Furthermore, the mechanical seal arrangement according to the invention can dispense with the intermediate seal, for example in the form of a labyrinth seal between the first mechanical seal 2 and the second mechanical seal 3. This can simplify production further and, in particular, reduce the cost of manufacture. Another advantage of the mechanical seal arrangement 1 is the compact design thereof. This makes the mechanical seal arrangement 1 particularly suitable for replacing mechanical seal arrangements which are already installed in place, for example in compressor stations of pipelines. The mechanical seal arrangement 1 according to the invention is particularly suitable for very high pressures up to approx. $160 \cdot 10^5$ Pa.

Figure 2:
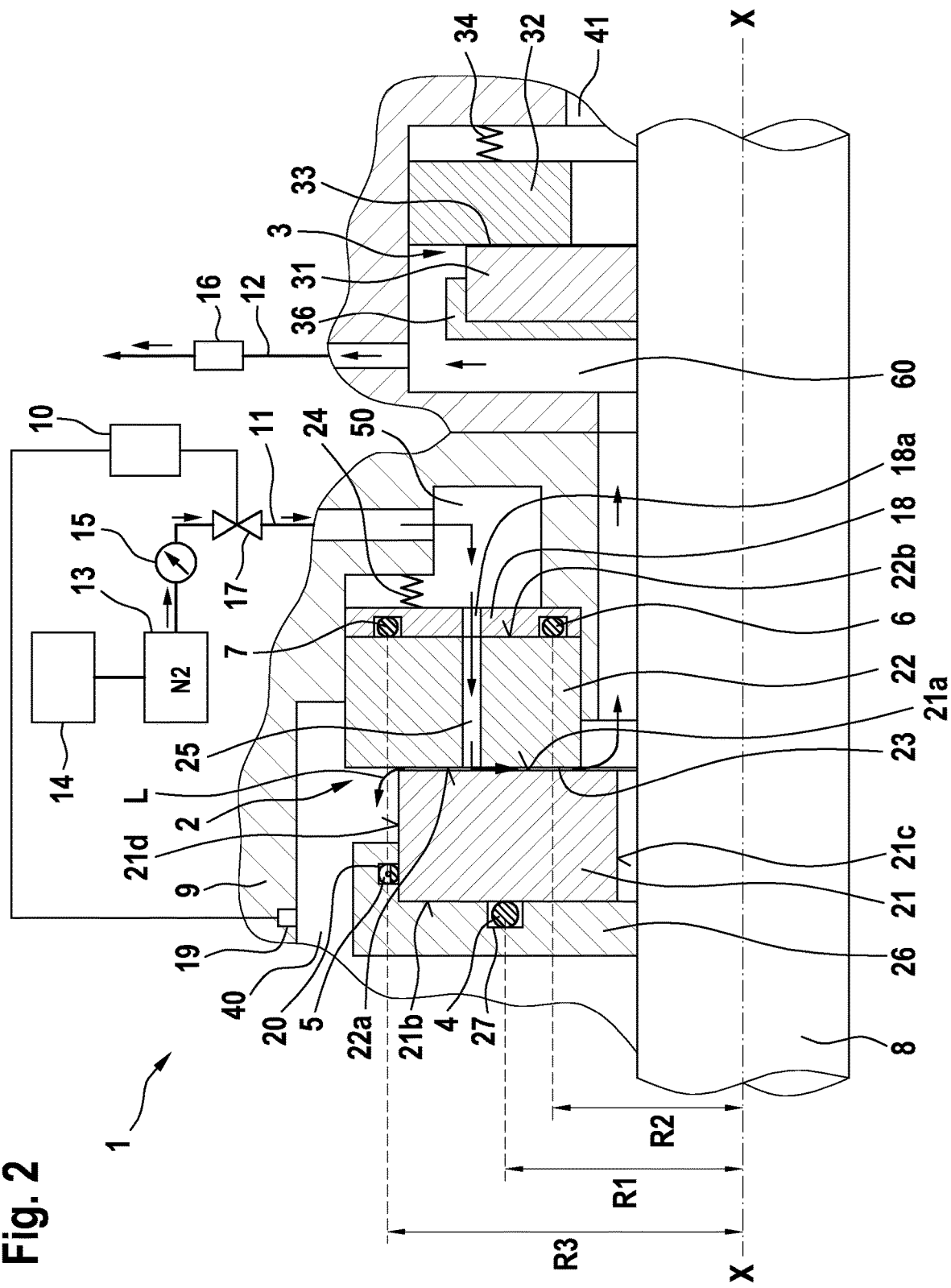
FIG. 2 is a schematic section view of a mechanical seal arrangement according to a second preferred example embodiment of the invention.

FIG. 2 shows a gas-lubricated mechanical seal arrangement 1 according to a second example embodiment of the invention, wherein identical or operative identical parts are designated as in the first example embodiment.

Contrary to the first example embodiment, the centering device 5 is arranged on a radially outer surface 21*d* of the first rotating slide ring 21, in the second example embodiment. A groove 20 is provided in the first slide ring carrier 26 which accommodates the centering device 5. In this example embodiment, the first slide ring 21 can also be configured without disturbing and costly recesses or depressions or the like.

Referring now to the two example embodiments described above, it should be noted that it is also possible that two centering devices 5, namely a first centering device on a radially inner surface 21*c*, as seen in the first example embodiment, and a second centering device 5 on a radially outer surface 21*d* as seen in the second example embodiment, can be provided on the first slide ring 21.

Referring now to the example embodiments, it should also be noted that instead of a ring-shaped biasing spring, a ring-shaped circumferential biasing band may also be used as a centering device, or alternatively an O-ring may be used, which, however, does not have to be optimized with regard to sealing properties, as sealing at the first mechanical seal 21 is provided by the first secondary seal 4.

In addition to the above written description of the invention, explicit reference will herein be made to the graphical representation of the invention in the figures for supplementary disclosure of the invention.

LIST OF REFERENCE NUMBERS 1 mechanical seal arrangement
2 first mechanical seal
3 second mechanical seal
4 first secondary seal
5 centering device
6 second secondary seal
7 third secondary seal
8 shaft
9 housing
10 control unit
11 feed line
12 return line
13 nitrogen source
14 nitrogen generator
15 flow sensor
16 monitoring device
17 differential pressure control valve
18 retaining ring
18*a* through-hole
19 pressure sensor
20 groove
21 first rotating slide ring
21*a* sliding surface
21*b* rear surface
21*c* radially inner surface
21*d* radially outer surface
22 first stationary slide ring
22*a* sliding surface
22*b* rear surface
23 first sealing gap
24 first biasing member
25 passageway
26 first slide ring carrier
27 groove
31 second rotating slide ring
32 second stationary slide ring
33 second sealing gap
34 second biasing member
36 second slide ring carrier
40 product chamber
41 atmosphere
50 first chamber
60 second chamber
L leakage
R1 first radius
R2 second radius
R3 third radius
X-X central axis

The invention claimed is:

1. A gas lubricated mechanical seal arrangement comprising:
a first mechanical seal having a first rotating slide ring and a first stationary slide ring defining a first sealing gap between sliding surfaces,
wherein the first stationary slide ring includes a passageway for supplying a barrier fluid to the first sealing gap, the passageway extending from a rear surface to the sliding surface of the first stationary slide ring,
wherein on the first rotating slide ring a first secondary seal for sealing and a centering device for centering of the first rotating slide ring are arranged,
wherein the centering device is disposed on a radially inner surface of the first rotating slide ring and/or a radially outer surface of the first rotating slide ring,
wherein a second secondary seal and a third secondary seal are disposed in grooves in a retaining ring of the first stationary slide ring and directly contact a rear surface of the first stationary slide ring, wherein a fluid path of the barrier fluid to the passageway in the first stationary slide ring extends through the retaining ring and between the second and third secondary seals,
wherein a first radius of the first secondary seal is in a first range between a second radius of the second secondary seal and a third radius of the third secondary seal, and
wherein a fourth radius of an outer periphery of the first rotating slide ring is in a second range between the first radius and the third radius.

2. The mechanical seal arrangement according to claim 1, further comprising a second mechanical seal having a second rotating slide ring and a second stationary slide ring defining a second sealing gap between sliding surfaces.

3. The mechanical seal arrangement according to claim 1, wherein the centering device is a circumferential biasing spring or a circumferential biasing band or an O-ring.

4. The mechanical seal arrangement according to claim 1, wherein the barrier fluid is nitrogen and the mechanical seal arrangement further comprises a nitrogen source.

5. The mechanical seal arrangement according to claim 4, further comprising a nitrogen generator.

6. The mechanical seal arrangement according to claim 1, further comprising a control unit, a differential pressure control valve in the supply line, and a pressure sensor for determining a product pressure in a product chamber, wherein the control unit is adapted to control the differential pressure control valve based on the product pressure.

7. The mechanical seal arrangement according to claim 1, further comprising a monitoring device disposed in a return line.

8. A compressor or supercharger for gaseous media, comprising a mechanical seal arrangement according to claim 1.

9. The mechanical seal arrangement according to claim 1, wherein the passageway and the first secondary seal are provided on the same or a similar radius.

\* \* \* \* \*